US010234563B2

(12) United States Patent
Joh et al.

(10) Patent No.: US 10,234,563 B2
(45) Date of Patent: Mar. 19, 2019

(54) METHOD FOR DISPLAYING DISASTER AND SAFETY INFORMATION, AND PORTABLE DEVICE

(71) Applicant: KOREA INSTITUTE OF SCIENCE & TECHNOLOGY INFORMATION, Daejeon (KR)

(72) Inventors: Minsu Joh, Daejeon (KR); Jooneun An, Daejeon (KR); Taejin Ha, Sejong (KR)

(73) Assignee: KOREA INSTITUTE OF SCIENCE & TECHNOLOGY INFORMATION, Daejeon (KR)

( * ) Notice: Subject to any disclaimer, the term of this patent is extended or adjusted under 35 U.S.C. 154(b) by 0 days.

(21) Appl. No.: 15/576,260

(22) PCT Filed: May 26, 2016

(86) PCT No.: PCT/KR2016/005578
§ 371 (c)(1),
(2) Date: Nov. 21, 2017

(87) PCT Pub. No.: WO2016/190679
PCT Pub. Date: Dec. 1, 2016

(65) Prior Publication Data
US 2018/0143326 A1 May 24, 2018

Related U.S. Application Data

(60) Provisional application No. 62/167,250, filed on May 27, 2015.

(51) Int. Cl.
*G01S 19/17* (2010.01)
*G08B 21/10* (2006.01)
(Continued)

(52) U.S. Cl.
CPC .............. *G01S 19/17* (2013.01); *G01S 19/05* (2013.01); *G08B 7/066* (2013.01); *G08B 21/10* (2013.01)

(58) Field of Classification Search
CPC ....................................................... G01S 19/17
(Continued)

(56) References Cited

U.S. PATENT DOCUMENTS 9,298,254 B2 * 3/2016 Ha .............................. G06F 3/01
2018/0143326 A1 * 5/2018 Joh ........................ G08B 21/10

FOREIGN PATENT DOCUMENTS

JP 2012-194738 A 10/2012
KR 10-2009-0011068 A 2/2009
(Continued)

OTHER PUBLICATIONS

English Translation KR20130085653A, May 4, 2018.*
International Search Report in International Application No. PCT/KR2016/005578, dated Sep. 9, 2016.

*Primary Examiner* — William D Cumming
(74) *Attorney, Agent, or Firm* — Park, Kim & Suh, LLC (57) ABSTRACT

A portable device is configured to display disaster and safety information and a method is configured to control the portable device to display the disaster and safety information. The portable device includes a global positioning system (GPS) module for receiving position information of the portable device and an information receiving module for receiving the disaster and safety information. A sensor module of the portable device detects an inclination of the portable device and the processor module of the portable device visualizes the disaster and safety information in a first person view or a third person view according to the sensed inclination. A display module of the portable device displays the disaster and safety information based on weather pre- (Continued)

diction information and/or forest fire damage prediction information.

11 Claims, 8 Drawing Sheets

(51) Int. Cl.
*G01S 19/05* (2010.01)
*G08B 7/06* (2006.01)

(58) Field of Classification Search
USPC .................................................. 455/404.1
See application file for complete search history.

(56) References Cited

FOREIGN PATENT DOCUMENTS

| | | |
|---|---|---|
| KR | 10-2010-0085297 A | 7/2010 |
| KR | 10-2012-0096757 A | 8/2012 |
| KR | 10-2013-0085653 A | 7/2013 |

\* cited by examiner

METHOD FOR DISPLAYING DISASTER AND SAFETY INFORMATION, AND PORTABLE DEVICE

CROSS-REFERENCE TO RELATED APPLICATIONS

This application is the National Stage filing under 35 U.S.C. 371 of International Application No. PCT/KR2016/005578, filed on May 26, 2016, which claims the benefits of U.S. Provisional Application No. 62/167,250, filed on May 27, 2015, the contents of which are all hereby incorporated by reference herein in their entirety.

TECHNICAL FIELD

The present invention relates to a method and portable device for displaying disaster and safety information.

BACKGROUND ART

Conventionally, there is no example of technology for receiving and visualizing three-dimensional (3D) terrain and disaster and safety information in real time on the spot and a workstation or a desktop that is a conventional apparatus for visualizing disaster and safety information is used, but it is difficult to use the workstation or the desktop due to limited portability and mobility. In addition, the aforementioned conventional devices need a long time for an operation and it is difficult to use the devices because a method of changing an observation view is not intuitive and needs repeated user input.

DISCLOSURE

Technical Problem

An object of the present invention devised to solve the problem lies in a method and portable device for displaying disaster and safety information.

Technical Solution

The object of the present invention can be achieved by providing a portable device for displaying disaster and safety information, including a global positioning system (GPS) module configured to receive position information of the portable device, an information receiving module configured to receive the disaster and safety information, the disaster and safety information including at least one of terrain information, weather information, weather prediction information, and forest fire damage information, related to a point corresponding to the position information, a sensor module configured to detect inclination of the portable device, a processor module configured to visualize the disaster and safety information in a first person view or a third person view according to the detected inclination value, and a display module configured to display the disaster and safety information.

In another aspect of the present invention, provided herein is a method of displaying disaster and safety information, the method including receiving position information of a portable device, receiving the disaster and safety information, the disaster and safety information including at least one of terrain information, weather information, weather prediction information, and forest fire damage information, related to a point corresponding to the position information, detecting inclination of the portable device, visualizing the disaster and safety information in a first person view or a third person view according to the detected inclination value, and displaying the disaster and safety information.

Advantageous Effects

As described above, the present invention may provide a method and portable device for displaying disaster and safety information to be used on location at a disaster due to high portability and mobility.

In addition, the present invention may provide a method and portable device for displaying disaster and safety information and, accordingly, may be easily used by a user because a method of changing an observation view does not require intuitive and repeated user input.

BEST MODE

Reference will now be made in detail to the preferred embodiments of the present invention, examples of which are illustrated in the accompanying drawings. In the description of the present invention, certain detailed explanations of the related art are omitted when it is deemed that they may unnecessarily obscure the essence of the invention.

Figure 1:
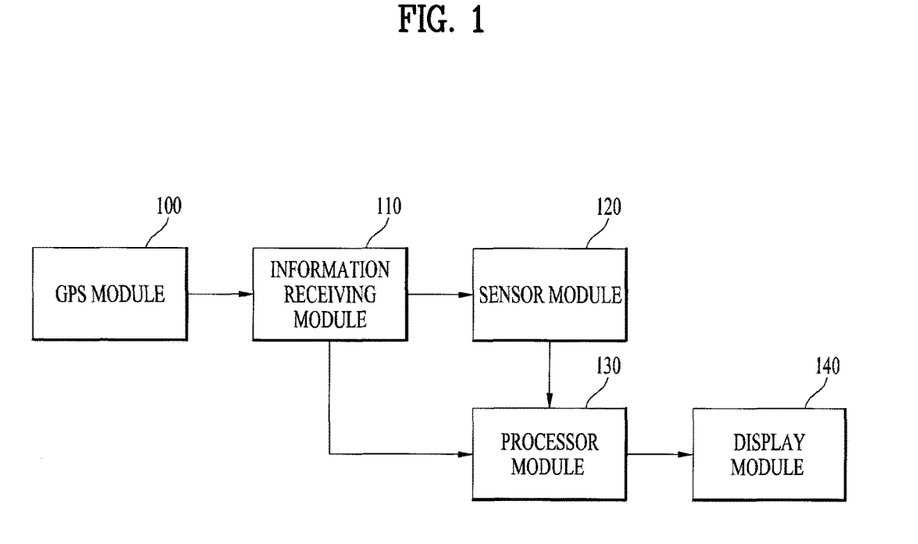
FIG. 1 is a diagram showing a configuration of modules of a portable device for displaying disaster and safety information.

FIG. 1 is a diagram showing a configuration of modules of a portable device for displaying disaster and safety information. Here, the portable device may be one of a smartphone and a tablet and may be one of wearable devices in the form of a necklace, glasses, or a watch. In addition, the disaster and safety information may include forest fire damage related information, flood damage related information, and typhoon damage related information.

Referring to FIG. 1, the portable device for displaying disaster and safety information may include at least one of a global positioning system (GPS) module 100, an information receiving module 110, a sensor module 120, a processor module 130, and/or a display module 140.

The GPS module 100 may receive GPS information of a user. The aforementioned GPS information of the user may correspond to position information of a device or user position information. Hereinafter, the GPS information of the user will be described. The information receiving module 110 of the GPS information of the user may receive the disaster and safety information. Here, the disaster and safety information may include at least one of terrain information, weather information, weather prediction information, and forest fire damage information, associated with a point corresponding to the GPS information. The aforementioned weather information may include weather observation information. The sensor module 120 may detect inclination of portable device. Based on the disaster and safety information received by the information receiving module, the processor module 130 may visualize information included in the disaster and safety information. The disaster and safety information may be visualized in a first person view or a third person view according to the detected inclination value. Here, the first person view may refer to visualization in a user view and may be, for example, a street view, or the like. The third person view may refer to visualization in an observer view and may be, for example, an aerial view, or the like.

The display module 140 may display the disaster and safety information. The display module may include a liquid crystal display (LCD) or an organic light emitting diode (OLED) display and may include a deformable flexible display.

Figure 2:
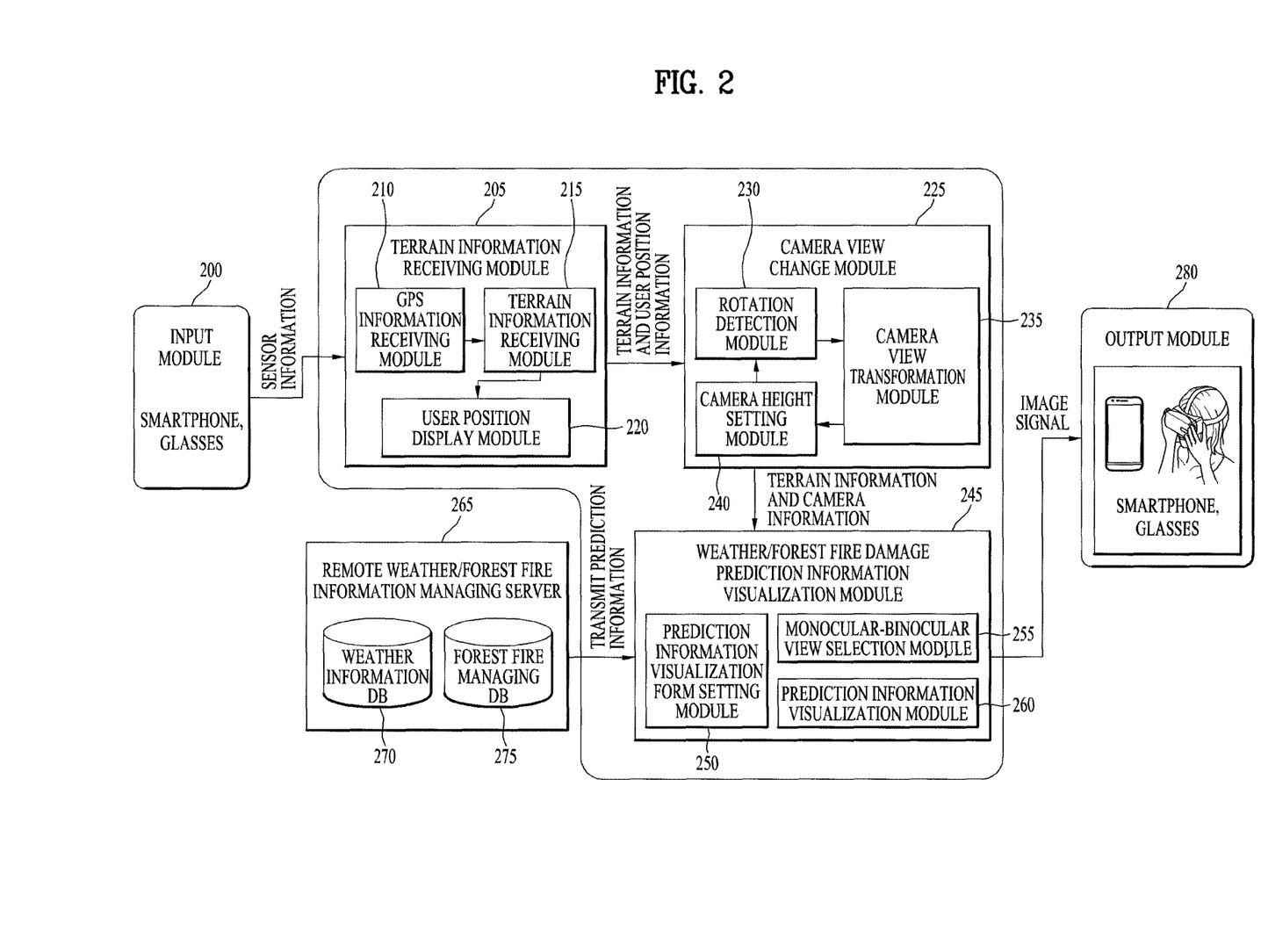
FIG. 2 is a diagram for explanation of a portable device for displaying disaster and safety information.

FIG. 2 is a diagram for explanation of a portable device for displaying disaster and safety information.

Referring to FIG. 2, the portable device for displaying the disaster and safety information may include a terrain information receiving module 205, a camera view change module 225, and a weather/forest fire damage prediction information visualization module 245. Here, the camera view change module and the weather/forest fire damage prediction information visualization module may be included as one module in the portable device and may be included in the processor module that has been described with reference to FIG. 1.

The terrain information receiving module 205 may include a GPS information receiving module 210, a terrain information receiving module 215, and a user position display module 220. The GPS information receiving module 210 may correspond to the aforementioned GPS module 100, may function as the GPS module 100, and may receive GPS information of the portable device. In detail, the GPS information receiving module 210 may receive GPS information of a user. The terrain information receiving module 215 may function as the aforementioned information receiving module 110. In detail, the terrain information receiving module 215 may receive terrain information of a point corresponding to information of a user position, received by the GPS information receiving module. The terrain information may be stored in the portable device according to an embodiment of the present invention or may be received from a separate terrain database (DB) positioned outside the portable device. The user position display module 220 may receive the aforementioned information of a user position, may add the information to a miniMAP, and may display the user portion on the miniMAP.

The camera view change module 225 may include a rotation detection module 230, a camera view transformation module 235, and a camera height setting module 240. The camera view change module may correspond to the aforementioned processor module and may function as a processor module. The portable device may include a camera installed therein for visualizing and displaying the disaster and safety information and the camera view change module may set the aforementioned virtual camera. The rotation detection module 230 may correspond to the aforementioned sensor module and may function as a sensor module. The rotation detection module may measure a rotation value or inclination value of the portable device. The camera view transformation module 235 may receive the measured rotation value or inclination value and may transform a current view to a first person view or a third person view. In detail, when the inclination value detected by the camera view transformation module 235 exceeds a predetermined range or is less than a predetermined value, the camera view transformation module 235 may recognize a current state as a state in which the portable device is laid flat and may transform a current view to a third person view. When the detected inclination value is within a predetermined range or is greater than a predetermined value, the camera view transformation module 235 may recognize a current state as a state in which the portable device is positioned upright and may transform a current view to a first person view. When the current view is visualized in a first person view, the camera height setting module 240 may set a virtual camera to a value corresponding to a terrain altitude height by using the terrain information received from the terrain information receiving module 205. When the current view is visualized in a third person view, the camera height setting module 240 may sum a value corresponding to the terrain altitude height and a predetermined value to set a height of the virtual camera using terrain information.

The weather/forest fire damage prediction information visualization module 245 may include a prediction information visualization form setting module 250, a monocular-binocular view selection module 255, and a prediction information visualization module 260. The weather/forest fire damage prediction information visualization module may correspond to the aforementioned processor module and may function as a processor module. The prediction information visualization form setting module 250 may receive disaster and safety information including weather information, weather prediction information, and forest fire damage prediction information from a remote weather/forest fire information managing server 265 and set a visualization form or type. The monocular-binocular view selection module 255 may set whether the aforementioned disaster and safety information is visualized in a monocular view or a binocular view. The prediction information visualization module 260 may receive terrain information, virtual camera information, and disaster and safety information from the camera view change module and may visualize a current view in a first person view or a third person view and a mono view or a binocular view.

Figure 3:
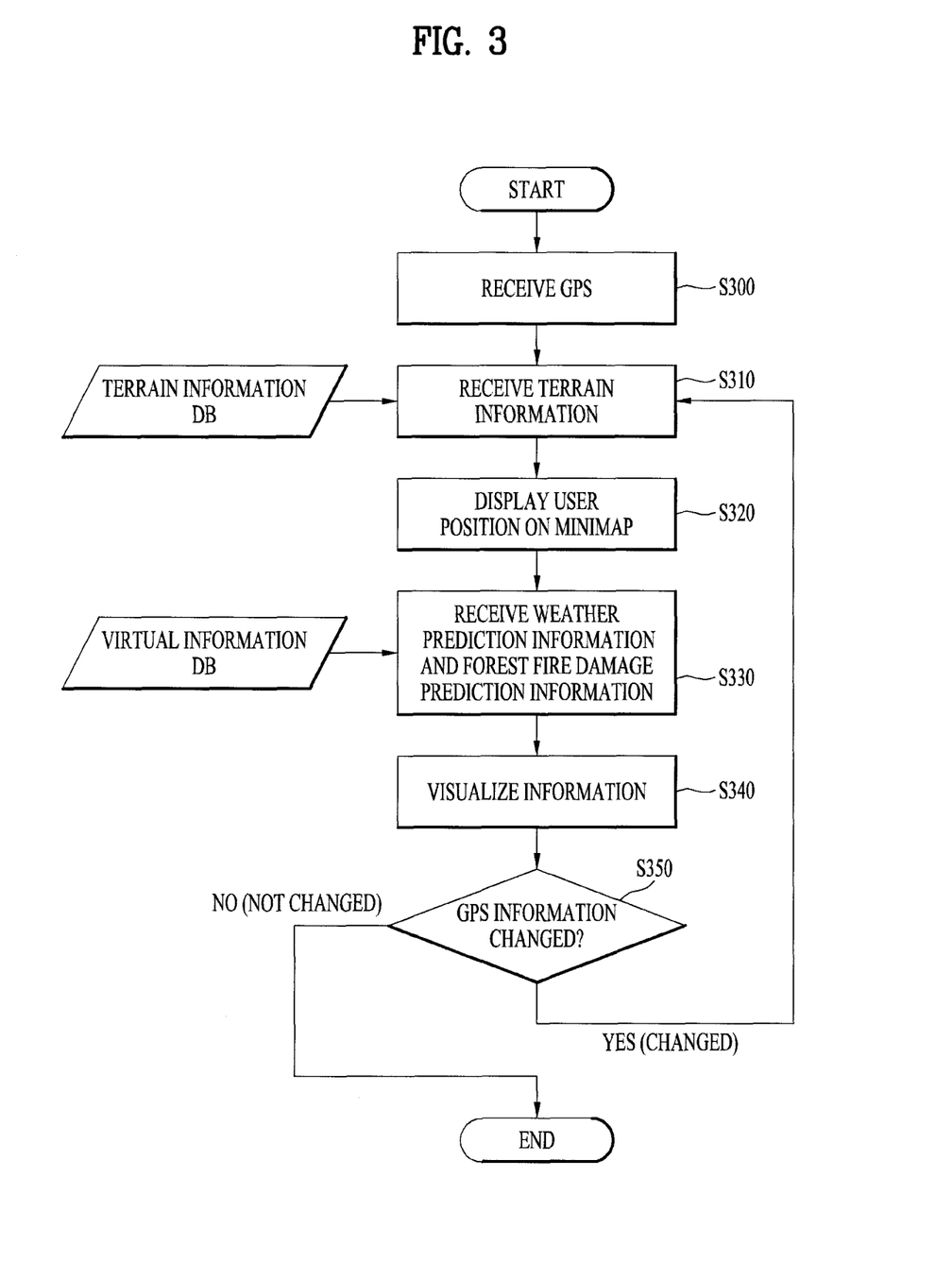
FIG. 3 is a flowchart for explanation of a procedure of displaying disaster and safety information according to an embodiment of the present invention.

FIG. 3 is a flowchart for explanation of a procedure of displaying disaster and safety information according to an embodiment of the present invention.

Referring to FIG. 3, a GPS module may receive GPS information of a user (S300) and, then, an information receiving module may receive terrain information of a point corresponding to the aforementioned GPS information from a terrain information DB (S310). Then, a display module may display the aforementioned GPS information of the user and terrain information on a miniMAP on the portable device (S320). Then, the information receiving module may receive weather prediction information or forest fire damage prediction information from the weather information DB (S330). Then, a processor module may visualize the aforementioned weather prediction information or forest fire damage prediction information in a first person view or a third person view (S340). A visualization method of the processor module will be described with reference to FIGS. 3 and 4.

When the aforementioned GPS information of a user is changed, the information receiving module may receive terrain information of a point corresponding to the aforementioned GPS information from the terrain information DB and may update the terrain information, and subsequent operations are the same as the above description (S350).

Figure 4:
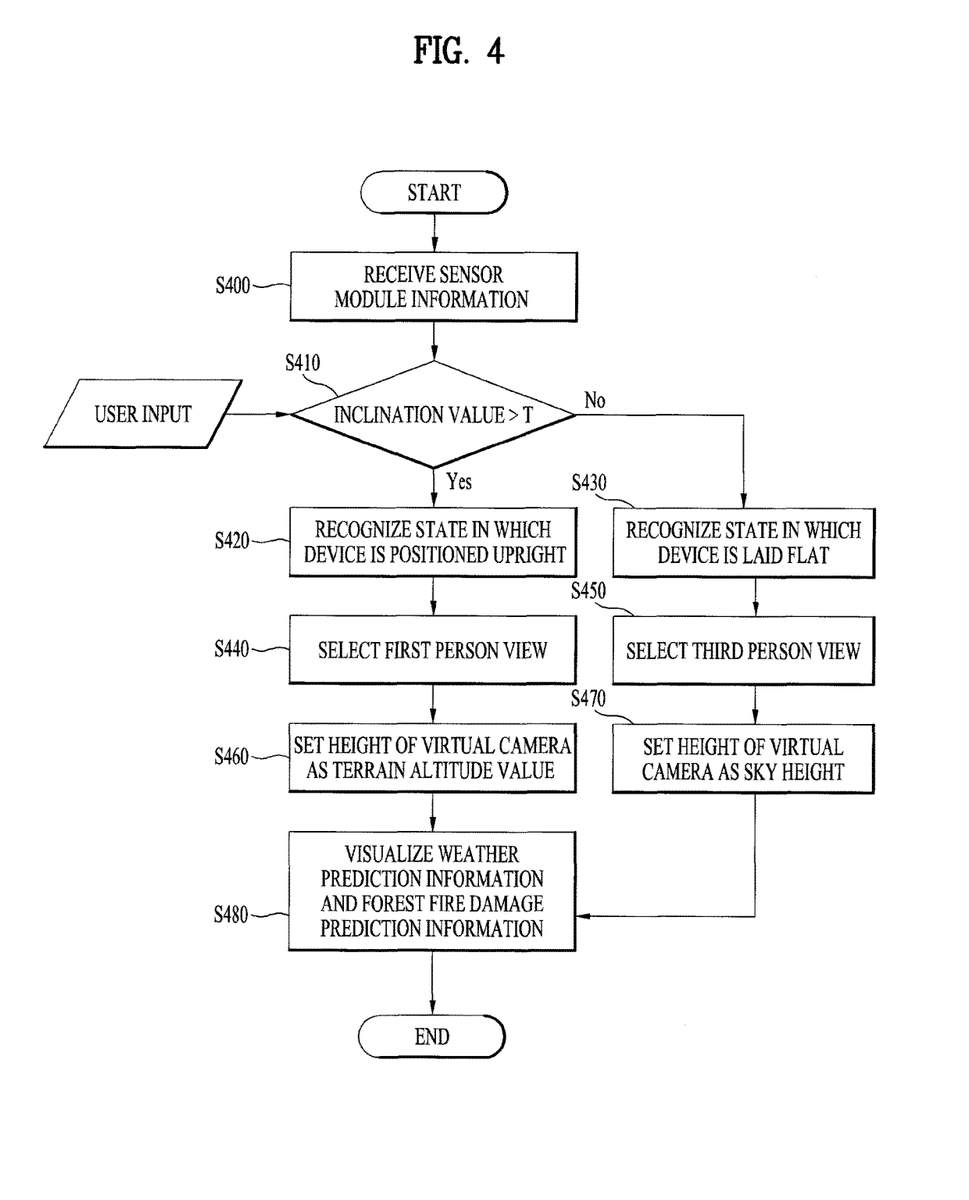
FIG. 4 is a flowchart for explanation of a first person view or third person view visualization method of a processor module.

FIG. 4 is a flowchart for explanation of a first person view or third person view visualization method of a processor module.

Referring to FIG. 4, in the first person view or third person view visualization method of the processor module, a sensor module of a portable device may receive sensor module information of an inclination value (S400). Then, the processor module may measure whether the detected inclination value exceeds a predetermined range or is greater than a predetermined value (S410). When the inclination value exceeds the predetermined range or is less than the predetermined value, the processor module may recognize a current state as a state in which the portable device is laid flat (S420). Then, the processor module may select a third person view and may perform visualization (S450). Then, in the case of visualization in a third person view, the processor module may sum a value corresponding to a terrain altitude height and a predetermined value to set a virtual camera height using the terrain information (S470). Then, the processor module may visualize the aforementioned disaster and safety information (S480). In the case of visualization in a third person view, forest fire damage information may be checked in a wide view range.

When the detected inclination value is within the preset range or is greater than the predetermined value, the processor module may recognize a current state as a state in which the portable device is positioned upright (S420). Then, the processor module may select a first person view and perform visualization (S440). Then, in the case of visualization in a first person view, the processor module may be set to a value corresponding to the terrain altitude height using the terrain information. Then, the processor module may visualize the aforementioned disaster and safety information (S480). In the case of visualization in a first person view, a user may achieve an effect of directly viewing a forest fire in a first person view on the spot even if they are not present in the forest fire.

Figure 5:
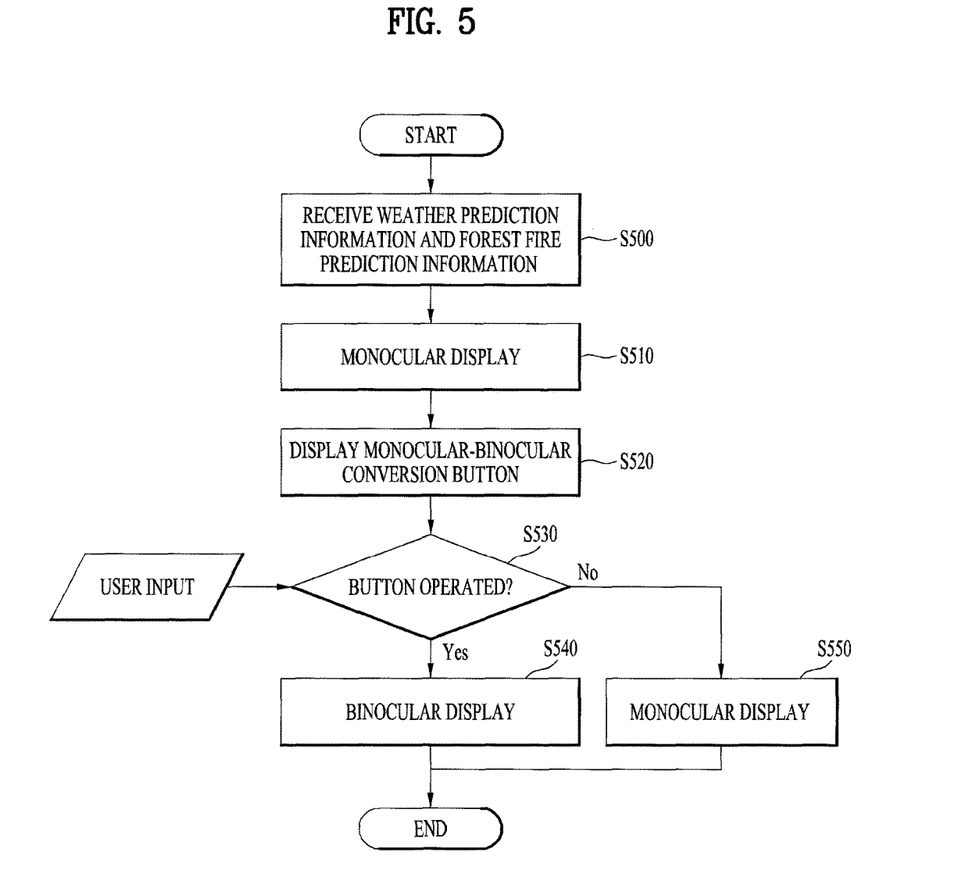
FIG. 5 is a flowchart for explanation of a monocular or binocular visualization method of a processor module.

FIG. 5 is a flowchart for explanation of a monocular or binocular visualization method of a processor module.

Referring to FIG. 5, an information receiving module may receive weather prediction information and forest fire damage prediction information (S500). Then, a display module may basically display the aforementioned weather prediction information and forest fire damage prediction information in a monocular view (S510). Then, the processor module may visualize disaster and safety information including the aforementioned weather prediction information and forest fire damage prediction information in a monocular or binocular view (S520). In detail, when a user pushes a monocular or binocular conversion button, the display module may display the aforementioned disaster and safety information in a binocular view (S530 and S540) and, when the user does not push the button, the display module may display the aforementioned disaster and safety information in a monocular view (S530 and S550). Here, monocular display may refer to display using a monocular method for providing a 2D image. Binocular display may refer to display using a binocular method for providing a 3D image.

Figure 6:
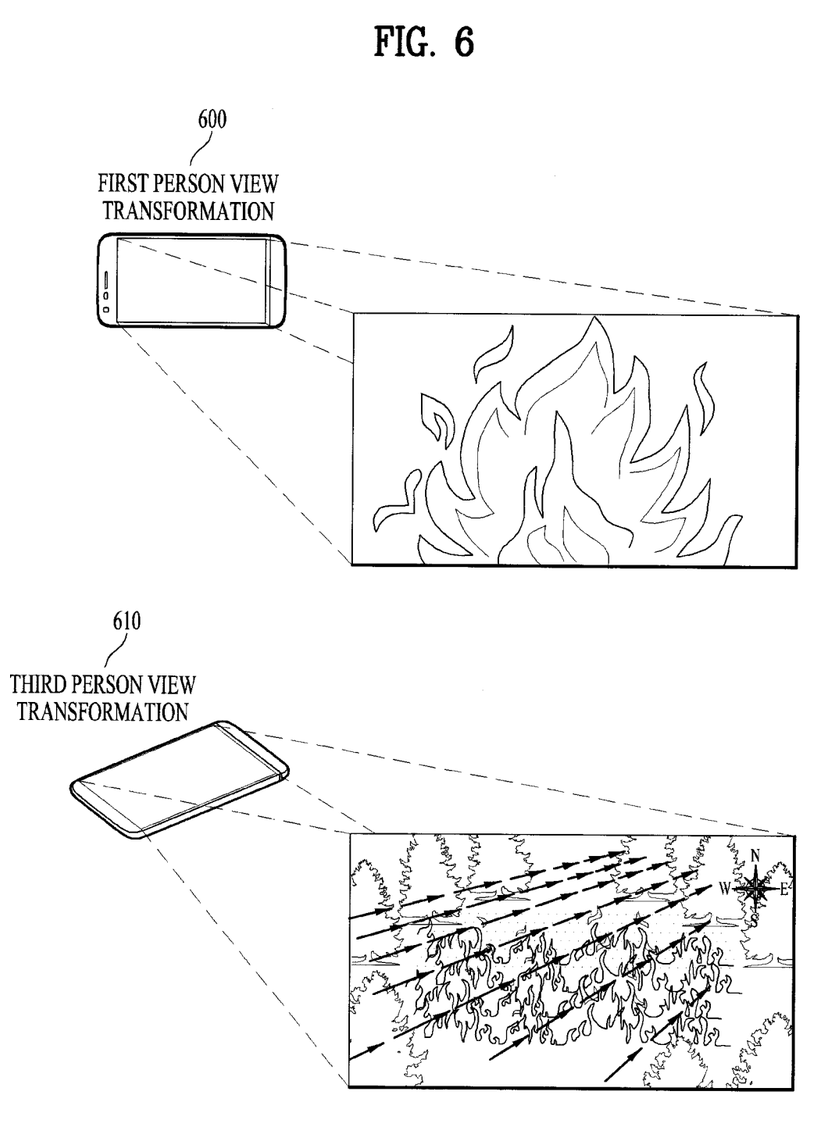
FIG. 6 is a diagram showing the case in which a display module displays disaster and safety information in a first person view or a third person view.

FIG. 6 is a diagram showing the case in which a display module displays disaster and safety information in a first person view or a third person view.

Referring to FIG. 6, in the case of first person view transformation (600), the portable device may be positioned upright and disaster and safety information may be visualized in a first person view to achieve an effect of directly viewing a target on location. In the case of third person view transformation (610), the portable device may be laid flat and the disaster and safety information may be visualized in a third person view to check the forest fire damage information in a wide view range. In detail, when the portable device is visualized in a third person view, the user may check terrain information, a wind direction (arrow), azimuth, a range and moving direction of forest fire, an evacuation path, or the like. Here, when the portable device is a cellular phone, an inclination value according to a state in which the portable device is laid flat or is positioned upright may be used as described above, but when the portable device is a wearable device, a wearing angle of the user may be used, which corresponds to the aforementioned inclination value. When the portable device is visualized in a third person view of reference numeral 610, the aforementioned visualized display module may include a plurality of layers and, thereamong, a first layer may indicate user GPS information and terrain information, a second layer may include weather prediction information and forest fire damage prediction information, and a third layer may include information on an evacuation path. The third layer may be displayed to be overlapped on the first and second layers. The second layer may be displayed to be overlapped on the first layer. The aforementioned information on the evacuation path may take priority over weather prediction information, forest fire damage prediction information, user GPS information (user position information), and terrain information. Accordingly, the third layer including the information on the evacuation path may be displayed on an uppermost portion of a plurality of layers so as not to be omitted or not to be hidden by information included in the second layer and information included in the first layer. The aforementioned display module may display the aforementioned third layer above the first layer or the second layer to accurately transmit information as a display target to the user.

Figure 7:
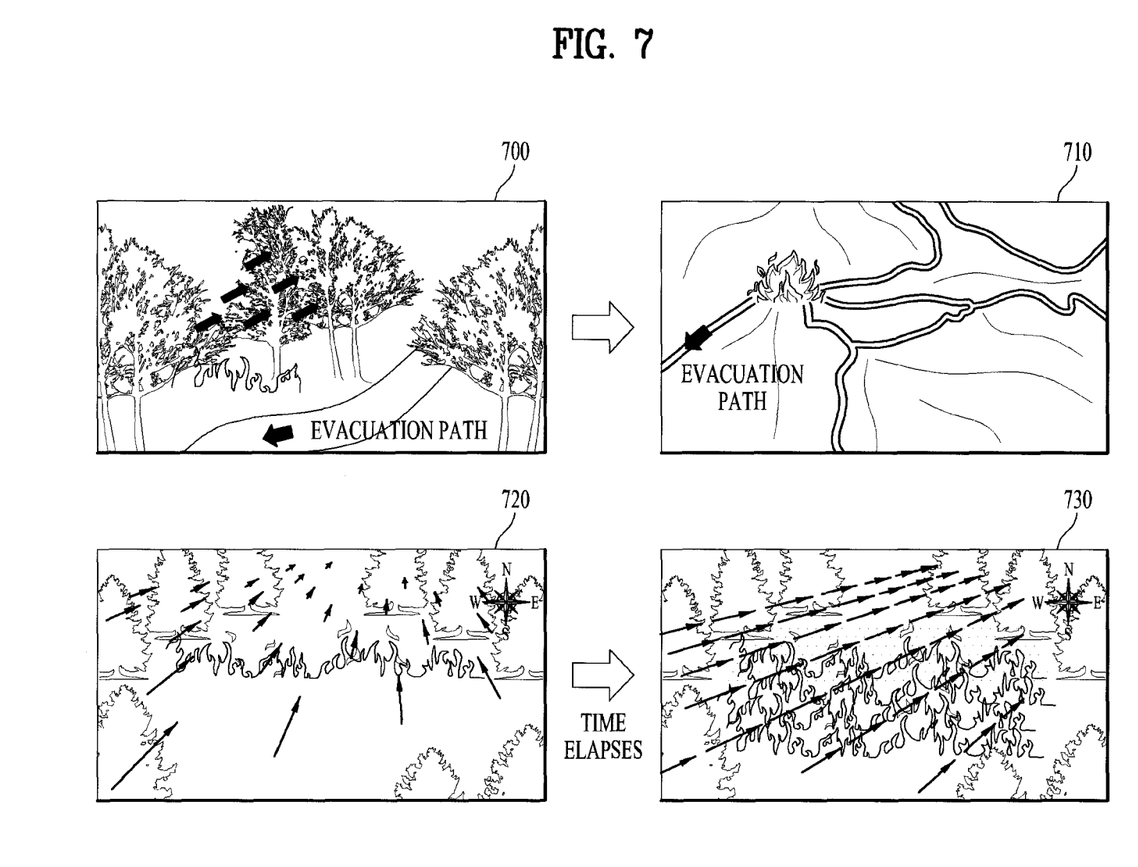
FIG. 7 is a diagram showing the case in which disaster and safety information and information on an evacuation path are updated to correspond to change in GPS information.

FIG. 7 is a diagram showing the case in which disaster and safety information and information on an evacuation path are updated to correspond to change in GPS information.

Referring to FIG. 7, in the case of reference numerals 700 and 710, a display module displays disaster and safety information in a third person view and, in the case of reference numeral 710, a height of a virtual camera of a portable device is set to be higher than in the case of reference numeral 700. As GPS information of a user is changed, the disaster and safety information and the information on the evacuation path may be updated. The display module may include a plurality of layers. Thereamong, a first layer may indicate user GPS information and terrain information, a second layer may include weather prediction information and forest fire damage prediction information, and a third layer may include the information on the evacuation path. The aforementioned display module may display the aforementioned third layer above the first layer or the second layer to accurately transmit information as a display target to the user.

In the case of reference numerals 720 and 730, the display module may display disaster and safety information in a third person view and, in the case of reference numeral 720, a height of the virtual camera of the portable device is set to be equal to the case of reference numeral 730. As GPS information of a user is changed, disaster and safety information including weather prediction information and forest fire damage prediction information and information on an evacuation path may be updated. In detail, in the case of reference numeral 720, a heading direction of wind (arrow) is north from south and a heading direction of forest fire is north from south. In the case of reference numeral 730, a heading direction of wind is north east from south west and a heading direction of forest fire is also north east from south west.

Figure 8:
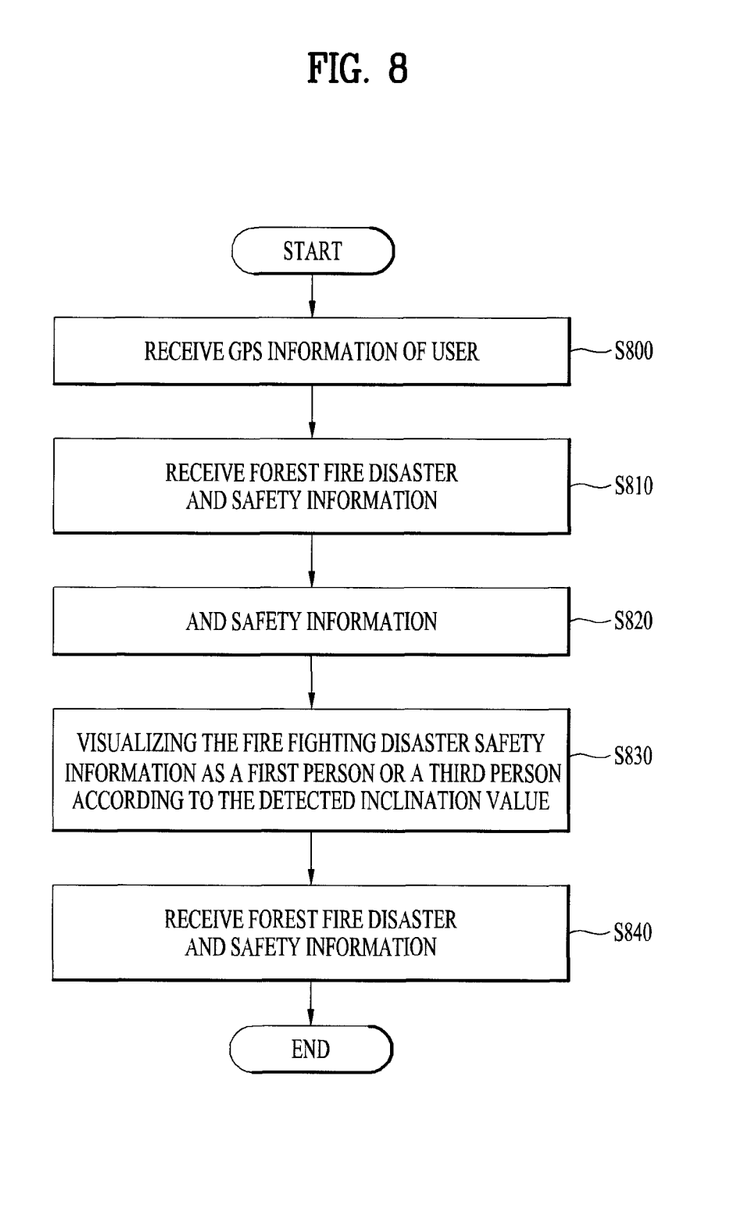
FIG. 8 is a flowchart for explanation of a method of displaying disaster and safety information.

FIG. 8 is a flowchart for explanation of a method of displaying disaster and safety information.

Referring to FIG. 8, the method of displaying the disaster and safety information may include receiving GPS information of a user (S800), receiving disaster and safety information (S810), detecting inclination of a portable device (S820), visualizing the disaster and safety information in a first person view or a third person view according to the detected inclination value (S830), and displaying the disaster and safety information (S840).

The GPS module may perform the reception of the GPS information of the user in the method of displaying the disaster and safety information. A description thereof has been given before with reference to FIGS. 1, 2, and 3. The information receiving module may perform the reception of the disaster and safety information. In detail, the information receiving module may receive information on a user position from the GPS module and may receive terrain information of a point corresponding to the information on the user position from a terrain DB. A description thereof has been given before with reference to FIGS. 1, 2, 3, 4, and 5. The detecting of the inclination of the sensor module portable device may be performed. In detail, a rotation value or inclination value of the portable device may be measured and whether the detected inclination value is within a predetermined range or is less than a predetermined value may be detected. A description thereof has been given before with reference to FIGS. 1, 2, 3, 4, and 5. The processor module may perform the visualization of the disaster and safety information in a first person view or a third person view according to the detected inclination value. A description thereof has been given before with reference to FIGS. 1 and 2. The display module may perform the display of the disaster and safety information. A description thereof has been given before with reference to FIGS. 1 and 2.

MODE FOR INVENTION

Various embodiments have been described in the best mode for carrying out the invention.

INDUSTRIAL APPLICABILITY

As described above, the present invention may be wholly or partially applied to a method and portable device for displaying disaster and safety information.

The invention claimed is:

1. A portable device for displaying disaster and safety information, the portable device comprising:
a global positioning system (GPS) module configured to receive position information of the portable device;
an information receiving module configured to receive the disaster and safety information, the disaster and safety information including terrain information related to a location corresponding to the position information;
a sensor module configured to detect an inclination of the portable device;
a processor module configured to visualize the disaster and safety information in a first person view or a third person view according to the detected inclination of the portable device; and
a display module configured to display the disaster and safety information,
wherein the processor module further visualizes evacuation path information along with the disaster and safety information to be displayed by the display module and the evacuation path information is generated using weather prediction information and/or forest fire damage prediction information, and
wherein the evacuation path information is overlapped on both a first layer including the position information and the terrain information and a second layer including the weather prediction information and/or the forest fire damage prediction information, such that the evacuation path information is not concealed by the first and second layers.

2. The portable device according to claim 1, wherein the disaster and safety information and the evacuation path information are updated to correspond to a change in the position information.

3. The portable device according to claim 1, wherein, when the detected inclination is within a predetermined range, the processor module performs visualization in the first person view, and when the visualization is performed in the first person view, the processor module sets the first person view to correspond to a terrain altitude and performs the visualization using the terrain information.

4. The portable device according to claim 1, wherein, when the detected inclination exceeds a predetermined range, the processor module performs visualization in the third person view, and when the visualization is performed in the third person view, the processor module sets the third person view to correspond to a sum of a terrain altitude and a predetermined value using the terrain information and performs the visualization.

5. The portable device according to claim 1, wherein the disaster and safety information is updated at a predetermined time interval.

6. A method of displaying disaster and safety information, the method comprising:
receiving position information of a portable device;
receiving the disaster and safety information, the disaster and safety information including terrain information related to a location corresponding to the position information;
detecting an inclination of the portable device;
visualizing the disaster and safety information in a first person view or a third person view according to the detected inclination of the portable device; and
displaying the disaster and safety information,
wherein the visualizing comprises visualizing evacuation path information along with the disaster and safety information to be displayed by the portable device and the evacuation path information is generated using weather prediction information and/or forest fire damage prediction information, and
wherein the evacuation path information is overlapped on both a first layer including the position information and the terrain information and a second layer including the weather prediction information and/or the forest fire damage prediction information, such that the evacuation path information is not concealed by the first and second layers.

7. The method according to claim 6, wherein the disaster and safety information and the evacuation path information are updated to correspond to a change in the position information.

8. The method according to claim 6, wherein, when the detected inclination is within a predetermined range, the visualizing comprises performing visualization in the first person view, and when the visualization is performed in the first person view, the visualizing comprises setting the first person view to correspond to a terrain altitude and performing the visualization using the terrain information.

9. The method according to claim 6, wherein, when the detected inclination exceeds a predetermined range, the visualizing comprises performing visualization in the third person view, and when the visualization is performed in the third person view, the visualizing comprises setting the third person view to correspond to a sum of a terrain altitude and a predetermined value using the terrain information and performing the visualization.

10. The method according to claim 6, wherein the visualizing comprises visualizing the disaster and safety information using a monocular display method or a binocular display method.

11. The method according to claim 6, wherein the disaster and safety information is updated at a predetermined time interval.

* * * * *